United States Patent [19]

Kuga et al.

[11] Patent Number: 4,725,662

[45] Date of Patent: Feb. 16, 1988

[54] LAMINATE AND METHOD FOR ITS PREPARATION

[75] Inventors: Kazuhiko Kuga; Hiroshi Washita; Hiroyuki Watanabe, all of Yokohama, Japan

[73] Assignee: Asahi Glass Company Ltd., Tokyo, Japan

[21] Appl. No.: 933,375

[22] Filed: Nov. 21, 1986

Related U.S. Application Data

[62] Division of Ser. No. 825,545, Feb. 3, 1986, Pat. No. 4,683,171.

[30] Foreign Application Priority Data

Feb. 5, 1985 [JP] Japan .................................. 60-19266

[51] Int. Cl.⁴ ............................................. C08G 18/44
[52] U.S. Cl. ........................................ 528/80; 428/38; 428/40; 428/409; 428/423.3; 528/81; 528/83; 528/85

[58] Field of Search .................. 528/80, 81, 83, 85

[56] References Cited

U.S. PATENT DOCUMENTS 3,639,354  2/1972  Muller et al. ...................... 528/85

*Primary Examiner*—Maurice J. Welsh
*Attorney, Agent, or Firm*—Oblon, Fisher, Spivak, McClelland & Maier

[57] ABSTRACT

A transparent laminate made of a transparent hard material having a soft synthetic resin layer on its surface, wherein the soft synthetic resin layer has, at its exposed surface side, a surface of a cross-linked polyurethane type resin having a self-healing property with the surface reformed by impregnating an addition-polymerizable unsaturated compound into the cross-linked polyurethane resin surface and polymerizing the impregnated compound.

7 Claims, No Drawings

LAMINATE AND METHOD FOR ITS PREPARATION

This is a division of application Ser. No. 825,545, filed Feb. 3, 1986 now U.S. Pat. No. 4,583,171.

The present invention relates to a laminate having a soft synthetic resin layer on one side. More particularly, it relates to a laminate having a soft synthetic resin layer having excellent surface properties.

A laminated safety glass comprising a hard transparent sheet such as an inorganic glass sheet and a soft synthetic resin layer formed on one side of the hard transparent sheet, is known as a window material for automobiles. The soft synthetic resin layer has a function to prevent a damage to a human body when the hard transparent sheet is broken (such a function being referred to as a damage-resistant property) or a function to absorb an impact energy when a human body collides therewith. One of serious problems with respect to the laminated safety glass of this type is in the surface properties of the soft synthetic resin layer. The soft synthetic resin layer is likely to have scars due to e.g. scratching, is likely to be stained and tends to be damaged by a solvent. In order to prevent the formation of scars on the surface of the soft synthetic resin layer, it is known to protect the surface with a hard synthetic resin layer which is commonly called a hard coating layer. The hard coating layer usually has good stain resistance and solvent resistance as well. However, the hard coating layer formed on a soft synthetic resin layer has a problem that it is susceptible to breakage. For instance, when the soft synthetic resin surface is pressed, the soft synthetic resin can yield with a deformation to some extent, whereas the hard coating layer can not follow the deformation and cracks will be formed quite easily in the hard coating layer. In order to solve the problem of the easy breakage of the hard coating layer, it has been proposed to use a soft synthetic resin having specific surface properties as the surface protective layer of the soft synthetic resin layer or as the surface of the soft synthetic resin layer itself, as disclosed in British Pat. No. 1394271. This soft synthetic resin has a property which is called a self-healing property or a self-restoration property. The self-healing property is a property whereby scars formed by e.g. scratching will spontaneously disappear as time passes. For instance, British Pat. No. 1370480 discloses a soft synthetic resin having such a self-healing property, which is made of a certain cross-linked polyurethane type resin (which is sometimes called a thermosetting polyurethane type resin or a network polyurethane type resin).

A laminated safety glass having a soft synthetic resin layer having a cross-linked polyurethane type resin surface having a self-healing property on one side of a sheet of inorganic glass or laminated glass, is known and disclosed, for instance, in British Pat. Nos. 1394271, and 1576394, U.S. Pat. No. 4232080 and European Pat. No. 54491. The above-mentioned laminated glass is a laminate in which a pair of inorganic glass sheets are laminated with an intermediate film of e.g. a polyvinylbutyral type resin being interposed therebetween. The laminated safety glass requires a soft synthetic resin layer having mechanical properties such as an energy-absorbing property and penetration resistance. The above-mentioned conventional cross-linked polyurethane type resin having a self-healing property does not have such mechanical properties. Accordingly, the laminated safety glass wherein a sheet of inorganic glass is used, includes two layers i.e. one layer made of a polyvinylbutyral type resin or a thermoplastic polyurethane type resin to provide the mechanical properties and having good adhesiveness to the inorganic glass surface and a layer of a cross-linked polyurethane type resin having a self-healing property to protect the adhesive layer. In the laminated safety glass in which a laminated glass is used, the intermediate film of the laminated glass provides the mechanical properties, and thus the soft synthetic resin layer may be composed solely of a cross-linked polyurethane type resin. However, such a cross-linked polyurethane type resin does not provide adequate adhesiveness to the inorganic glass in many cases. Therefore, it is preferred to provide a thin layer of an adhesive material between the inorganic glass layer and the cross-linked polyurethane type resin layer. As such an adhesive material, a thermoplastic resin may be used, and in particular, the above-mentioned polyvinylbutyral type resin or thermoplastic polyurethane type resin is advantageously employed. In short, in the laminated safety glass in which a sheet of inorganic glass is used, a thick adhesive layer is employed to provide adequate mechanical properties, whereas in the laminated safety glass in which a laminated glass is employed, a thin adhesive layer is employed since the adhesive layer is not required to have such mechanical properties.

Recently, a cross-linked polyurethane type resin having good mechanical properties as well as a self-healing property or a laminated safety glass using such a polyurethane resin has been proposed (European Pat. No. 131523). However, such a cross-linked polyurethane type resin does not necessarily have adequately satisfactory surface properties. Therefore, it is considered advisable to protect the surface of such a cross-linked polyurethane type resin with the above-mentioned conventional cross-linked polyurethane type resin (European Pat. Nos. 132198 and 133090).

Thus, a soft synthetic resin layer having a surface of the conventional cross-linked polyurethane type resin does not adequately satisfy all the surface properties required for a laminated safety glass although it provides a self-healing property as an excellent surface property. In particular, an improvement is desired for stain resistance. The stain resistance is a property whereby various stains hardly attach to or penetrate into the surface or a property whereby the attached stains can readily be removed. The present inventors have studied the surface-reforming to improve the stain resistance of the cross-linked polyurethane type resin surface having a self-healing property. In this surface-reforming, it is important that the reforming does not impair the self-healing property of the cross-linked polyurethane type resin. Accordingly, it is not feasible to form a layer of another material on the surface of the cross-linked polyurethane type resin layer. Taking these points into consideration, the present inventors have made various studies for the improvement of the cross-linked polyurethane type resin surface, and as a result, have found it possible to achieve the object by impregnating an addition-polymerizable unsaturated compound into the surface of the cross-linked polyurethane type resin and curing the impregnated compound. As the addition-polymerizable unsaturated compound, esters of acrylic acid or methacrylic acid (hereinafter referred to as "(meth)acrylic acid" as a term representing both acrylic acid and methacrylic acid) i.e. acrylates or methacrylates (hereinafter referred to as "(meth)a- crylates" as a term representing both acrylates and methacrylates) are useful. (Meth)acrylates are known as a part of starting materials for the formation of the above-mentioned hard coating layer. However, the formation of a hard coating layer is not desirable for the above-mentioned reason or for the reason that the self-healing property of the cross-linked polyurethane type resin is thereby lost. In the present invention, it is important that (meth)acrylates should not be applied in excess of the amount impregnated into the cross-linked polyurethane type resin to the surface of the cross-linked polyurethane type resin. (If applied excessively, the excess amount should be removed prior to the polymerization). Further, the surface of the cross-linked polyurethane type resin should not substantially contain a polymer layer composed solely of a polymer of a (meth)acrylate containing no cross-linked polyurethane type resin component. The term "should not substantially contain a polymer layer" means that even when such a layer is formed, its thickness is so thin that it does not impair the surface properties of the cross-linked polyurethane type resin, and it does not provide any substantial characteristic as the polymer layer. Such a thickness is usually less than 1 $\mu$m. In the present invention, the surface-reforming by the impregnation and curing of the (meth)acrylate serves to prevent the penetration of stains into the cross-linked polyurethane type resin surface and facilitates the removal of stains attached to the cross-linked polyurethane type resin surface.

Thus, the object of the present invention is to provide a laminate such as a laminated safety glass having a cross-linked polyurethane type resin layer with the surface reformed as mentioned above, and to provide a process for its preparation.

Another object of the present invention is to provide a pre-laminated sheet useful for the production of the laminate and to provide a process for preparing such a pre-laminated sheet.

Namely, the present invention provides a transparent laminate made of a transparent hard material having a soft synthetic resin layer on its surface, wherein the soft synthetic resin layer has, at its exposed surface side, a surface of a cross-linked polyurethane type resin having a self-healing property with the surface reformed by impregnating an addition-polymerizable unsaturated compound into the cross-linked polyurethane resin surface and polymerizing the impregnated compound.

The present invention provides also a method for preparing a transparent laminate which comprises laminating a transparent hard material and a pre-laminated sheet including a soft synthetic resin layer, in which the pre-laminated sheet has, at its one side, a surface of an adhesive material layer and, at the other side, a surface of a cross-linked polyurethane type resin having a self-healing property with the surface reformed by the impregnation and polymerization of an addition-polymerizable unsaturated compound, and the pre-laminated sheet is laminated onto the transparent hard material with the surface of said adhesive material layer being the lamination surface.

Further, the present invention provides a pre-laminated sheet of a cross-linked polyurethane type resin having, at one side, a surface reformed by the impregnation and polymerization of an addition polymerizable unsaturated compound and having a self-healing property and, at the other side, a layer of an adhesive material.

The present invention further provides a method for preparing a pre-laminated sheet which comprises forming a layer of an adhesive material on one side of a sheet of a cross-linked polyurethane type resin having a self-healing property, protecting the surface of the adhesive material layer with a removable protective film or sheet, and then impregnating an addition-polymerizable unsaturated compound into the exposed side of the cross-linked polyurethane resin sheet and polymerizing the impregnated compound.

Still further, the present invention provides a sheet of a cross-linked polyurethane type resin having a self-healing property and having an elongation of at least about 250% and a breaking strength of at least about 300 kg/cm$^2$, wherein the cross-linked polyurethane type resin is a cross-linked polyurethane type resin obtained by reacting (a) a relatively high molecular weight polyol comprising at least one diol and at least one tri- or higher valent polyol and having an equivalent ratio, of the tri- or higher valent polyol to the diol of from about 0.1 to about 0.6 and an average hydroxyl value of from about 70 to about 150, wherein at least a part of the relatively high molecular weight polyol is a polycarbonate type polyol, (b) a substantially bivalent chain extender in an amount of from about 0.4 to about 1.8 equivalent relative to one equivalent of the above polyol, and (c) a substantially bivalent polyisocyanate compound in an amount of from about 0.8 to about 1.2 equivalent relative to one equivalent of the total of the above polyol and chain extender.

Now, the present invention will be described in detail with reference to the preferred embodiments.

The laminate of the present invention is most preferably a laminated safety glass having an inorganic glass surface at one side and a reformed cross-linked polyurethane type resin surface at the other side, which comprises a transparent hard sheet made of a sheet of inorganic glass or a sheet of a laminated glass and a single layered or multi-layered soft synthetic resin layer with at least its surface being a reformed surface of the cross-linked polyurethane type resin. However, the present invention is not restricted thereto, and may be applied generally to a laminated safety glass in which one side or both sides of a sheet of organic glass, a laminated sheet of inorganic or organic glass other than the laminated glass, a laminate of inorganic glass and organic glass, an inorganic or organic lens or other transparent hard material, are protected with a soft synthetic resin layer, or to other transparent laminates. As the organic glass material, a polycarbonate type resin or an acrylic resin is useful. The soft synthetic resin layer may be composed solely of the surface reformed cross-linked polyurethane type resin layer having a self-healing property. However, in a laminated safety glass in which inorganic glass is employed, an adhesive layer made of an adhesive material may be interposed between the inorganic glass surface and the cross-linked polyurethane type resin. This adhesive layer may be a thin layer or a thick layer capable of providing good mechanical properties. The adhesive material is preferably a thermoplastic synthetic resin such as a polyvinylbutyral type resin, a thermoplastic polyurethane type resin or an EVA type resin. The EVA type resin is a synthetic resin composed of a copolymer of monomers essentially composed of ethylene and vinyl acetate or a partial hydrolysate thereof.

The cross-linked polyurethane type resin having a self-healing property may be cross-linked polyurethane type resins disclosed in the above-mentioned prior art references. For instance, there may be mentioned a cross-linked polyurethane type resin obtained by stoichiometrically reacting a polyether triol composed of a propyleneoxide adduct of trimethylolpropane and having a molecular weight of about 450 (hydroxyl value: about 374) with a tri- or higher valent polyisocyanate compound composed of a burette of 1,6-hexane diisocyanate. However, it is preferred to use a cross-linked polyurethane type resin having excellent mechanical properties as well as the self-healing property. Such a cross-linked polyurethane type resin is advantageous particularly for a laminated safety glass wherein a sheet of inorganic glass is employed. Namely, a laminated safety glass can be formed by laminating a cross-linked polyurethane type resin layer on one side of a sheet of inorganic glass with a thin adhesive layer interposed therebetween, whereby various problems involved in the use of a thick adhesive layer to provide adequate mechanical properties can be avoided. For instance, it is not easy to prepare a sheet having a thick adhesive material and yet having excellent optical properties, and it is also cumbersome to laminate such a sheet with a cross-linked polyurethane type resin. Whereas, it is easy to form a thin adhesive layer on one side of a sheet of a cross-linked polyurethane type resin. For instance, a cross-linked polyurethane type resin sheet having an adhesive layer can readily be prepared by coating a solution of an adhesive material. The details of the preferred cross-linked polyurethane type resin having a self-healing property and excellent mechanical properties in the present invention will be described hereinafter. Further, the adhesive layer is not necessarily required in a case where the cross-linked polyurethane type resin layer side of the transparent hard material is not an inorganic glass surface.

The laminate of the present invention is prepared preferably by laminating a sheet of a cross-linked polyurethane type resin having at one side an adhesive layer and at the other side a reformed surface, on a transparent hard material, particularly a sheet of inorganic glass or laminated glass. However, it is also possible to employ a method wherein three layers comprising a transparent hard material, an adhesive sheet or film and a crosslinkable polyurethane type resin sheet, are simultaneously laminated, or a method wherein an adhesive layer is formed on one side of a transparent hard material and laminating a sheet of a cross-linked polyurethane type resin is laminated thereon. Further, it is possible that firstly a cross-linked polyurethane type resin sheet having an adhesive layer on one side prior to the surface-reforming is laminated with a transparent hard material, and then the cross-linked polyurethane resin layer surface is reformed. Further, in some cases, it is possible that a material capable of forming a cross-linked polyurethane type resin is coated on the surface of the transparent hard material or on the surface of an adhesive layer of the transparent hard material to form a cross-linked polyurethane type resin layer, and then the cross-linked polyurethane type resin surface is subjected to surface-reforming. However, in the case of a laminated safety glass to be used as a window material for automobiles, it is usual to employ a sheet of inorganic glass or laminated glass subjected to bending processing. In such a case, the first mentioned method is most suitable. Hereinafter, a cross-linked polyurethane type resin sheet having an adhesive layer at one side and having a reformed surface at the other side will be referred to as a pre-laminated sheet.

The pre-laminated sheet may be prepared by a method wherein an adhesive layer is formed on one side of a cross-linked polyurethane type resin sheet, and then the other side of the sheet is subjected to surface-reforming, a method wherein one side (if necessary, both sides) of a cross-linked polyurethane type resin sheet is subjected to surface-reforming, and then an adhesive layer is formed on the other side, or a method wherein firstly a sheet or film of an adhesive material is formed, a cross-linked polyurethane type resin layer is formed on one side thereof to obtain a cross-linked polyurethane type resin sheet having an adhesive layer, and this cross-linked polyurethane type resin surface is subjected to surface-reforming. The cross-linked polyurethane resin sheet is preferably prepared by cast molding. Namely, it is preferably prepared by a method wherein a starting material mixture capable of forming a cross-linkable polyurethane type resin is spread on a flat surface of a non-adhesive substrate and solidified. A cross-linked polurethane type resin sheet having an adhesive layer is obtained either by coating a solution of an adhesive on the surface of the solidified cross-linked polyurethane type resin to form an adhesive layer and then peeling the resin layer from the substrate surface, or coating a solution of an adhesive to one side of the cross-linked polyurethane resin sheet peeled from the substrate surface. It is possible to obtain a cross-linked polyurethane type resin sheet having an adhesive layer by firstly forming an adhesive layer on the surface of a substrate or placing a film or sheet of an adhesive material on a substrate, casting a starting material mixture for forming a cross-linked polyurethane type resin thereon and curing the mixture, and then peeling the sheet thereby obtained from the substrate. A pre-laminated sheet may also be produced by subjecting the cross-linked polyurethane type resin surface to surface-reforming prior to peeling the sheet from the substrate. In a case where an adhesive layer is formed after the surface reforming of the cross-linked polyurethane type resin sheet, both sides of the cross-linked polyurethane type resin sheet may be subjected to surface-reforming. Namely, the reformed surface layer is so thin that it does not substantially affect the physical properties. Therefore, the cross-linked polyurethane resin surface on which an adhesive layer is formed, may be reformed so long as the adhesive is still capable of providing firm bonding. The surface of the adhesive layer may be reformed, but when the amount of the impregnated monomer is excessive, the adhesive strength is likely to deteriorate. An adhesive layer subjected to surface-reforming in the same manner as the cross-linked polyurethane type resin of the present invention is likely to have the adhesion to the transparent hard material deteriorated.

The pre-laminated sheet is prepared preferably as follows. Firstly an adhesive layer is formed on one side of a cross-linked polyurethane type resin sheet formed by cast molding. It is particularly preferred to form the adhesive layer by coating and drying a solution of the above-mentioned thermoplastic synthetic resin. Then, the surface of this adhesive layer is covered with a releasable protective film or sheet. Such a protective film or sheet may be made of plastics, paper or cloth coated with a non-adhesive silicon resin or a fluorine type non-adhesive agent. However, it is preferably made of a polyolefin type resin such as polypropylene or polyethylene, or a polyester type resin such as polyethylene terephthalate. Such a film or sheet preferably has fine irregularities (i.e. fine emboss) on the surface. By pressing this emboss against the adhesive layer surface, an adhesive layer having an emboss on its surface is formed. The emboss on the surface of the adhesive layer of the pre-laminated sheet facilitates the removal of air from the lamination surface at the time of the lamination with a transparent hard material, whereby the formation of a bubble-free interface is facilitated. While covering the adhesive layer surface with the protective film or sheet, the exposed surface of the cross-linked polyurethane type resin sheet is then treated with an addition-polymerizable unsaturated compound for surface-reforming. The unsaturated compound and the surface-reforming treatment will be described in detail hereinafter. The pre-laminated sheet thus obtained has its adhesive layer surface covered with the protective film or sheet, and it is usually stored in such a form. Then, the protective film or sheet is removed immediately prior to the lamination with a transparent hard material. In this manner, the deposition of dust or stains on the adhesive layer surface is prevented during the storage of the pre-laminated sheet.

There is no particular restriction as to a method for laminating the above-mentioned pre-laminated sheet with the transparent hard material. For instance, it is possible to employ a method wherein the pre-laminated sheet is sandwiched between a die having a releasing surface and the transparent hard material, followed by heat-pressing and removal of the die, or a method wherein the transparent hard material and the pre-laminated sheet are laminated without using such a die (e.g. U.S. Pat. No. 4,247,355 or U.S. Pat. No. 4,152,188). In some cases, it is also possible to employ a method wherein the transparent hard material and the pre-laminated sheet are joined together and heated under pressing with e.g. rolls. The lamination surface of the transparent hard material may be treated for an improvement of the adhesion prior to the lamination, as disclosed in the above-mentioned prior art references. For instance, in the case of inorganic glass, it is preferred to preliminarily treating the lamination surface with an organic silicon compound such as an alkoxy silane containing an amino group or a glycidoxy group. Further, in order to prevent air from remaining as bubbles at the lamination surface during the lamination, it is preferred to preliminarily subjecting the adhesive layer surface of the pre-laminated sheet to embossing treatment. The embossing treatment is a treatment to provide fine irregularities. By this embossing treatment, fine passages are formed between the laminated layers during the lamination, whereby the passages will gradually close while air, etc. are removed so that the possibility for air bubbles to remain will be minimized. The degree of the irregularities is usually not higher than a few micrometers.

In the laminated safety glass of the present invention, the transparent hard material is preferably a sheet having substantially a constant thickness or a sheet subjected to bending processing. The thickness is not critical, but is usually at least about 0.2 mm, preferably from about 2 to about 20 mm. When it is made of a sheet of inorganic glass, the thickness is preferably from about 2 to about 6 mm. When it is made of a laminated glass, the thickness is preferably from about 4 to about 10 mm. In the soft synthetic resin layer the thickness of the cross-linked polyurethane type resin layer subjected to surface-reforming is at least about 0.2 mm, preferably about 0.4 mm. Particularly, in a laminated safety glass wherein a cross-linked polyurethane type resin layer having the below mentioned high mechanical properties is laminated with a sheet of inorganic glass, the thickness of the layer is preferably from about 0.5 to about 1.5 mm. In this case, the adhesive layer is adequately thick if it is less than about 0.2 mm, particularly not higher than about 0.1 mm. The thickness of the adhesive layer is usually about 0.05 mm or less, preferably from 0.001 to 0.03 mm. The thickness of the adhesive layer in this range is a proper thickness when a laminated glass or an organic glass is used as the transparent hard material. When the adhesive layer is required to have high mechanical properties, for instance, in the case of a combination of a sheet of inorganic glass and a cross-linked polyurethane type resin having no high mechanical properties, it is common to employ an adhesive layer having a thickness of at least about 0.2 mm, preferably from about 0.4 to about 1.5 mm. The total thickness of the laminated safety glass is not necessarily limited to a constant thickness and may be varied depending upon the particular purpose. However, the total thickness is usually not higher than about 15 mm, preferably from about 3 to about 8 mm as a window material for automobiles.

The surface reforming of the cross-linked polyurethane type resin is conducted by impregnating an unsaturated compound having an addition-polymerizable unsaturated group, preferably at least one $\alpha$, $\beta$-unsaturated double bond, into the surface of a cross-linked polyurethane type resin and addition-polymerizing the unsaturated compound. Such addition-polymerizable unsaturated compound will be hereinafter referred to as a "monomer". As the monomer, it is preferred to employ a compound which is liquid at room temperature. However, a compound having a relatively low melting point which is soluble in a solvent may also be used. The monomer and the solvent to be used should not be those which adversely affect the cross-linked polyurethane type resin. The addition-polymerization of the monomer may be conducted by thermal polymerization. However, it is preferred that the polymerization is conducted by light such as ultraviolet rays or electron rays (hereinafter referred to as "energy rays"). The monomer may be used without being dissolved in a solvent. However, it is preferred to apply it on the surface of a cross-linked polyurethane type resin in a form of a composition dissolved in a solvent. Further, in the monomer composition, it is common to incorporate, in addition to the solvent, an addition-polymerization initiator such as a photopolymerization initiator or photosensitizer. Further, if necessary, a coloring agent or other additives may be incorporated.

As the monomer, not only one type but also a combination of two or more different types may be employed. The monomer may be a mono-functional type (having only one addition-polymerizable unsaturated group) or a polyfunctional type (having two or more such unsaturated groups). It is preferred to use a polyfunctional compound or a combination of a polyfunctional compound and a monofunctional compound. Preferred monomers include (meth)acrylate type monomers, i.e. esters of (meth)acrylic acid with a mono- or polyhydric alcohol. For instance, they include mono-functional (meth)acrylates such as alkyl esters of (meth)acrylic acid and poly-functional (meth)acrylates such as polyesters of (meth)acrylic acid with a poly-hydric alcohol. It is preferred to use a mono-functional (meth- )acrylate having a lower alkyl group (having not more than 4 carbon atoms) such as methyl (meth)acrylate, or a poly-functional (meth)acrylate selected from polyesters of (meth)acrylic acid having a residue of ethylene glycol, diethylene glycol or other polyethylene glycols, propylene glycol, dipropylene glycol or other polypropylene glycols, 1,4-butanediol, neopentyl glycol, 1,6-hexanediol, glycerol, trimethylolpropane, hexane triol, diglycerol, pentaerythritol, dipentaerythritol or other polyalcohols having not more than about 10 carbon atoms. It is more preferred to use a combination of such a mono-functional (meth)acrylate and a poly-functional (meth)acrylate. In order to further improve the stain resitance of the surface, a (meth)acrylate having a polyfluoroalkyl group or a perfluoroalkyl group may be used alone or in combination with the above-mentioned various (meth)acrylates. It is particularly preferred to employ a (meth)acrylate having a group represented by the formula $R_f(C_mH_{2m})_k$ wherein $R_f$ is a perfluoroalkyl group having from about 3 to about 20 carbon atoms, m is an integer of at least 1, and k is 0 or 1.

Other monomers than the above-mentioned (meth)acrylate type monomers may be used alone or in combination with the (meth)acrylate type monomers. As such other monomers, allyl type monomers such as esters, ethers or carbonates having an allyl group, styrene type monomers, siloxane type compounds having at least one addition-polymerizable unsaturated group (for instance, polydimethylsiloxane containaing an unsaturated group), acrylurethane type monomers (for instance, a reaction product of a hydroxyalkyl (meth)acrylate with an isocyanate group-containing compound), epoxy acrylate type monomers (for instance, a reaction product of a polyepoxy compound with (meth)acrylic acid), or other monomers, may be employed.

As the solvent for the monomer composition, it is possible to use a hydrocarbon type solvent, a halogenated hydrocarbon type solvent, an ester type solvent, an ether type solvent, a ketone type solvent or other various solvents which do not adversely affect the cross-linked polyurethane type resin. As the polymerization initiator, acetophenone, benzophenone, benzyl, benzoin, benzoin ether or other carbonyl compounds, a sulfurcontaining compound such as thioxanthon or diphenyldisulfide, an azo compound such as azobisisobutyronitrile, an organic peroxide compound such as benzoylperoxide or di-t-butylperoxide, an organic pigment, etc. may be employed. As the photosensitizer, an amine compound, a phosphorus compound, etc. may be employed. Further, a storage stabilizer may be incorporated into the monomer composition, if necessary.

The monomer or the monomer composition is applied to the surface of the cross-linked polyurethane type resin by brush coating, spray coating, dipping or other means. After the impregnation of the monomer, any excess monomer or monomer composition is preferably removed by drying, wiping off or any other means. Then, the polymerization of the monomer is conducted. It is preferred to conduct the polymerization of the monomer by irradiation of energy rays. Particularly preferred is the polymerization by irradiation of ultraviolet rays. The amount of the impregnated monomer can be adjusted by controlling the cross-linked polyurethane type resin surface, the period of time from the application of the monomer composition to the removal of the excess amount or the proportion of the monomer in the monomer composition. If the amount of the impregnated monomer is excessive, the self-healing property of the cross-linked polyurethane type resin surface is likely to deteriorate.

When touched by fingers, the reformed surface gives a distinctly different feeling as compared with the non-reformed surface, i.e. the sticky feeling is substantially reduced. The surface-reforming is preferably conducted to such an extent that by the ATR spectrum measurement, an absorption attributable to the polymer of the monomer is slightly observed or not substantially observed in addition to the absorption attributable to the cross-linked polyurethane type resin. When a polymer layer of the monomer is formed, the ATR specturm shows that most of the absorptions are attributable to the polymer and the polymer layer is readily broken when pressed. It is not desirable that the self-healing property lowers more than 50 g as measured by the measuring method described hereinafter, due to the surface-reforming. Usually, the degree of the lowering should be maintained within about 20 g, preferably within about 10 g.

The cross-linked polyurethane type resin of the present invention is a cross-linked polyurethane type resin having a self-healing property. As mentioned above, the cross-linked polyurethane type resin having a self-healing property is known. In the present invention, such a known cross-linked polyurethane type resin may be employed. However, it is preferred to employ a cross-linked polyurethane type resin having high mechanical properties as well as the self-healing property. The use of such a cross-linked polyurethane type resin brings about an excellent feature that it is thereby unnecessary to use a thick adhesive material having high mechanical properties such as a polyvinylbutyral type resin or a thermoplastic polyurethane type resin as mentioned above. The crosslinked polyurethane type resin having such properties will be described in detail.

The polyurethane type resin is obtained by a reaction of a polyvalent active hydrogen-containing compound, particularly a polyol, with a polyvalent isocyanate group-containing compound (hereinafter referred to as a "polyisocyanate compound"). In a case where these two types of compounds are both bivalent, a thermoplastic polyurethane type resin is obtainable, whereas in a case where at least one of them exceeds bivalent, a cross-linked polyurethane type resin is obtainable. The physical properties of the cross-linked polyurethane type resin depend primarily on the type of the active hydrogen-containing compound. In general, an elastomer of a polyurethane type resin having high mechanical properties can be obtained by using an active hydrogen-containing compound having a high molecular weight and an active hydrogen-containing compound having a low molecular weight which is referred to as a chain extender or a crosslinking agent, together. However, according to the study made by the present inventors, it has been found that the self-healing property and the high mechanical properties of the cross-linked polyurethane type resin have mutually opposing tendencies to each other. Namely, a cross-linked polyurethane type resin having high mechanical properties has a low self-healing property. Therefore, the cross-linked polyurethane type resin having these two types of properties is rather restricted to limited types of cross-linked polyurethane type resins. Accordingly, such a cross-linked polyurethane type resin is basically a cross-linked polyurethane type resin obtainable by using the following starting materials.

1. An active hydrogen-containing compound having a relatively high molecular weight, particularly a polyol, and an active hydrogen-containing compound having a low molecular weight (hereinafter referred to as a chain extender) must be used together. If the chain extender is not used, it is impossible to obtain a cross-linked polyurethane type resin having high mechanical properties.

2. The above polyol is required to be a combination of a diol and a tri- or higher valent polyol, and their average hydroxyl value is from about 70 to about 150, and the equivalent ratio of the tri- or higher valent polyol to the diol is within a range of from about 0.1 to about 0.6. If the average hydroxyl value and the equivalent ratio of the polyols are higher than the above ranges, the mechanical properties tend to deteriorate, and if they are lower than the above ranges, the self-healing property tends to deteriorate.

3. The chain extender should be a substantially bivalent compound having not more than about 2.1 functional groups. Likewise, the polyisocyanate compound should be a substantially bivalent polyisocyanate compound having not more than about 2.1 functional groups. If the number of functional groups exceeds the above level, the mechanical properties tend to deteriorate.

4. The amount of the chain extender should be from about 0.4 to about 1.8 equivalent relative to one equivalent of the polyol. If the amount exceeds this range, the self-healing property tend to deteriorate, and if the amount is less than this range, the mechanical properties tend to deteriorate.

As a prerequisite for the preparation of the cross-linked polyurethane type resin, the total equivalent of the polyol and the chain extender should be substantially equal to the equivalent of polyisocyanate compound. Particularly, it is preferred that the polyisocyanate compound is in an amount of from about 0.8 to about 1.2 equivalent to one equivalent of the total amount of the polyol and the chain extender. Further, the polyisocyanate compound is required to be a polyisocyanate compound having non-yellowing property. As a numerical value relating to the molecular weight of the polyol, a hydroxyl value is used, because when a diol and a tri- or higher valent polyol are used together, the effects of the molecular weights on the physical properties can not simply be represented by the average value of their molecular weights. The relation between the hydroxyl value and the molecular weight is represented by the following formula:

[OHV]=([a])/[MW])×56.1×10³
[OHV]:hydroxyl value (mgKOH/g)
[a]:number of functional groups
[MW]:molecular weight The above polyol is preferably a combination of a diol having a hydroxyl value of from about 40 to about 250, more preferably from about 60 to about 150, and a tri- or higher valent polyol having a hydroxyl value of from about 50 to about 300, more preferably from about 100 to about 250. Further, the combination of the diol and the tri- or higher valent polyol may be a combination of two or more different types of diols and two or more different types of tri- or higher valent polyols. In such a case, individual polyols may be outside the above-mentioned range so long as the average hydroxyl value is within the above-mentioned range. However, the upper limited of the hydroxyl value for each polyol should not exceed about 400 so that it should be distinguished from the chain extender which will be described hereinafter. On the basis of a hydroxyl value of from about 90 to about 100, a preferred diol is a combination of a diol exceeding the upper limit and a diol not exceeding the upper limit, or a combination of a diol less than the lower limit and a diol not less than the lower limit. The most preferred polyol is a combination of at least two types of diols having an average hydroxyl value of from about 60 to about 130 and at least one type of tri- or higher valent polyol, particularly a triol, having an average hydroxyl value of from about 150 to about 250. Further, the average hydroxyl value in the combination of the diol and the tri- or higher polyol is most preferably from about 80 to about 140, and their equivalent ratio as mentioned above is most preferably from about 0.15 to about 0.35. The chain extender comprises at least one type of a diol or a diamine having a molecular weight of not higher than about 280. Particularly preferred is a diol having a molecular weight of not higher than about 160. It is usually composed solely of bivalent compounds, although a tri- or higher valent low molecular weight active hydrogen-containing compound such as a low molecular weight triol, may be incorporated in a very small amount. The amount of the chain extender is most preferably from about 0.7 to about 1.3 equivalent relative to one equivalent of the polyol. In the case where the chain extender is a low molecular weight polyol, the average hydroxyl value of three components i.e. the above-mentioned diol having a relatively high molecular weight, a tri- or higher polyol and the low molecular weight polyol, is preferably from about 120 to 250, more preferably from about 150 to about 220, since the mechanical properties and the self-healing property exhibit the best performance, thus presenting the most preferred starting material for the cross-linked polyurethane type resin in the present invention. However, the average hydroxyl value is not limited to the above-mentioned range.

As the above-mentioned diol and tri- or higher valent polyol having a relatively high molecular weight, a polyester type polyol, a polycarbonate polyol and a poly(oxytetramethylene) type polyol are selected as the major polyol (which constitutes at least 50% of the total amount of polyols). A polyoxy propylene type polyol can not be used in a substantial amount from the viewpoint of the mechanical properties of the cross-linked polyurethane type resin. Particularly preferred polyols are a polyester type polyol and a polycarbonate type polyol. However, if a polyester type polyol is used alone, there will be some difficulty in the water resistance of the resulting cross-linked polyurethane type resin. On the other hand, the polycarbonate type polyol has high viscosity and is likely to lead to some difficulty in the preparation of a sheet by cast molding. Accordingly, it is most preferred to use them in combination. The polycarbonate type polyol has the above-mentioned problem because commercially available types are limited. However, if a polycarbonate polyol having a low viscosity is available, it may be possible to use such a polycarbonate type polyol alone. At present, the proportion of the polycarbonate type polyol in the total amount of polyols is at least about 15% by weight, preferably at least about 25% by weight. The tri- or higher valent polycarbonate type polyol is not commercially available at present, but is useful if available. In view of the viscosity problem and the difficulty in the availability of the polycarbonate type polyol, at present, the polyol which brings about the best cross-linked polyurethane type resin is a combination of the three components i.e. a tri- or higher valent polyester type polyol, a polycarbonate type diol and a polyester type diol. However, if such restriction is removed, the polyol is not restricted to such a combination. At present, the hydroxyl value of the polycarbonate type diol is preferably from about 40 to about 200, and the proportion of the polycarbonate type diol relative to the total amount of the diols is from about 25 to about 75% by weight, preferably from about 25 to about 60% by weight.

As the polycarbonate type polyol, a tri- or higher valent polycarbonate type polyol wherein ethylene glycol, diethylene glycol, dipropylene glycol, 1,4-butanediol, neopentyl glycol, 1,4-hexanediol, cyclohexanedimethanol or other aliphatic or alicyclic bivalent or higher valent alcohol is used, may also be employed. It is known to use a polyurethane type resin in which a polycarbonate type polyol is employed, for a laminated safety glass, as disclosed in e.g. U.S. Pat. Nos. 4,024,113, 4,103,070, 3,764,457 and 4,435,50. In the present invention, the polycarbonate type polyols disclosed in such prior art references may be employed. The most preferred polycarbonate type polyol is poly(1,6-hexanecarbonate) diol, or a polycarbonate diol containing residues of 1,6-hexanediol and 1,4-cyclohexanedimethanol.

The polyester type polyol includes a polyester type polyol having a polyhydric alcohol residue and a polybasic carboxylic acid residue, and a polyester type polyol having a hydroxycarboxylic acid residue. As the former, a polyester type polyol having a dihydric alcohol residue or a dihydricalcohol residue and a small aount of tri- or higher hydric alcohol residue, and a dibasic acid residue is preferred. For instance, a polyester type polyol having a residue of e.g. ethylene glycol, diethylene glycol, propylene glycol, dipropylene glycol, 1,4-butanediol, neopentyl glycol, 1,6-hexanediol, glycerol, trimethylolpropane or hexanetriol and a residue of e.g. adipic acid, azelaic acid, sebacic acid or phthalic acid may be mentioned. As the latter, a polyester type polyol obtainable by adding a cyclic ester or a hydroxy carbonic acid such as e-caprolactone (hereinafter referred to simply as "caprolactone") to the above-mentioned polyhydric alcohol, water or other polyvalent compound, is preferred. Further, it is possible to use the polyester type polyols disclosed in the above-mentioned prior art references, particularly in British Pat. No. 1576394 or European Pat. No. 54491.

The most preferred polyester type polyol is poly(1,4-butyrene adipate) type polyol, poly(ethylene adipate) type polyol, poly(1,4-butyrene azelate) type polyol or poly(caprolactone) type polyol. As a tri- or higher valent polyol, particularly as a triol, a poly(caprolactone) type polyol is particularly preferred.

As a major polyol other than the above-mentioned poly carbonate type polyol and polyester type polyol, it is possible to use a poly(oxytetramethylene) type polyol. This polyol is usually inferior to the above two in the mechanical properties and weatherability, but it is superior to the polyester type polyol in the water resistance. Therefore, it may be substituted partly or entirely for the polyester type polyol. However, it is usually advisable to use it not as the main polyol. Other polyols (for instance, polyoxypropylene type polyols or polybutadiene type polyols) are not usually employed. However, if they are used for some purpose, it is advisable to use them not as the main polyol. Of course, use of polyol is not restricted if it is superior in the mechanical properties, weatherability, water resistance, viscosity, etc.

As mentioned above, as the chain extender, a diol is preferred. For instance, ethylene glycol, diethylene glycol, 1,3-propanediol, diethylene glycol, 1,4-butanediol, neopentyl glycol, 1,5-pentanediol, 1,6-hexanediol or dimethylolcyclohexane may be employed. Instead of these diols, or in combination with these diols, a dihydroxy carboxylic acid or a diamine such as dimethylol acetic acid, dimethylol propionic acid, diaminodicyclohexylmethane or isophoronediamine, may be employed. A preferred chain extender is an aliphatic diol having from 2 to 6 carbon atoms. Particularly preferred is 1,4-butanediol and ethylene glycol.

As the polyisocyanate compound, a non-yellowing bivalent diisocyanate is used, as mentioned above. Specifically, there may be mentioned, for instance methylene-bis(cyclohexylisocyanate), isophorone diisocyanate, cyclohexane diisocyanate, tetramethylene diisocyanate, hexamethylene diisocyanate, and bivalent modified products thereof (for instance, prepolymer-type modified product or urea-modified products). Particularly preferred polyisocyanate compounds are 4,4'-methylene-bis(cyclohexylisocyanate) and isophorone diisocyanate. A small amount of a tri- or higher valent non-yellowing polyisocyanate may be incorporated. However, it is usual to employ a bivalent polyisocyanate compound alone.

The above described or other cross-linked polyurethane resins usually require in addition to the main starting materials, small amounts of subsidiary starting materials. In most cases, a catalyst and a stabilizer are essential starting materials. As the catalyst, an organic metal compound type catalyst such as an organic tin compound is useful. As the stabilizer, it is preferred to use one or more antioxidants, ultraviolet absorbers or photostabilizers. For instance, a hindered phenol type compound, a hindered amine type compound, a phosphate compound, a benzophenone type compound or a benzotriazole type compound may be used. Further, small amounts of a coloring agent, a flame retardant, a releasing agent, an adhesion-improving agent, etc. may also be incorporated depending upon the particular purpose. In some cases, a small amount of a diluent such as a solvent may be used. However, such a diluent is not usually required. The cross-linked polyurethane type resin can be prepared from the above materials by a method such as a one-shot method, a prepolymer method or a quasi-prepolymer method. Sheeting can be conducted by a casting method. It is particularly preferred to employ a method wherein the starting materials are mixed by a one-shot method, and the mixture is spread on a flat surface and then cured to form a sheet. The sheeting by means of a casting method is described in the above-mentioned mentioned prior art references or in U.S. Pat. No. 4,283,363 and European Pat. Nos. 38760, 131483 and 132169.

The cross-linked polyurethane type resin obtained by using the above-mentioned materials, has excellent mechanical properties. For instance, its elongation (i.e. breaking elongation) is at least about 250%, and the breaking strength is at least about 300 kg/cm$^2$. For instance, the cross-linked polyurethane type resins disclosed hereinafter in the examples, have an elongation of from about 300 to about 600% and a breaking strength of from about 500 to about 800 kg/cm$^2$. Besides, the relation between the elongation and the tensile strength up to the breakage (the relation represented by a stress-strain curve) is entirely different as between the above-mentioned cross-linked polyurethane type resin and the known cross-linked polyurethane type resin. Namely, the above-mentioned cross-linked polyurethane type resin shows a behavior similar to a thermoplastic polyurethane type resin having excellent mechanical properties, and it is evident that its mechanical properties are excellent. Whereas, the cross-linked polyurethane type resin known from U.S. Pat. No. 4,232,080 has an elongation of about 100% and a breaking strength of about 204 kg/cm$^2$ (the value obtained by converting the unit), thus indicating inadequate mechanical properties.

The elongation or the mechanical properties of the cross-linked polyurethane type resin usually deteriorate to some extent by the above-mentioned surface-reforming. The degree of the deterioration depends primarily on the amount of the impregnated monomer, but it may depend also on the poly-functionality of the monomer.

Now, the present invention will be described in further detail with reference to Examples. However, it should be understood that the present invention is by no means restricted to such specific Examples. The physical properties were measured by the following methods.

Methods for measuring physical properties

Self-healing property:

The cross-linked polyurethane type resin surface was scratched with a diamond chip having a diameter of 10 μm under various loads, and the self-healing property is represented by the maximum load where the scar or the scratch mark formed, disappeared within 10 minutes at 25° C. The disappearance of the scar was evaluated by naked eyes. In the case of inorganic glass having no self-healing property, a scar was formed under a load of about 5 g by this method.

Elongation, breaking strength and tensile strength:

In accordance with JIS K-6301.

Light transmission, Taber abrasion:

In accordance with JIS K-6301.

Penetration resistance:

In accordance with JIS R-3121. "Good" means that the steel ball did not pass through and the cracked glass remained adhered to the sheet and no scattering of glass was observed.

Stain resistance:

The cross-linked polyurethane type resin layer surface was marked with a felt pen, and 24 hours later, the marking was wiped with ethanol, whereupon the removal of the marking was evaluated.

Sense of touch:

The sense of touch when the surface of the cross-linked polyurethane type resin layer was rubbed with a finger. "Good" means smooth feeling of touch.

EXAMPLE 1

Preparation of a cross-linked polyurethane type resin sheet 43.86 parts (by weight, the same applies hereinafter) of poly(1,6-hexane carbonate)diol having a hydroxyl value of about 122, 68.93 parts of poly(caprolactone)-diol having a hYdroxyl value of about 90.5 and 12.54 parts of poly(caprolactone)triol having a hydroxy value of about 195.2 were heated and melted at 100° C., stirred and mixed while dehydrated and deaerated under reduced pressure. This polyol mixture was cooled to 80° C., and $6.0 \times 10^{-3}$ part of dibutyltin dilaurate (hereinafter referred to as a catalyst), 10.02 parts of 1,4-butanediol and 64.5 parts of 4,4-methylenebis(cyclohexylisocyanate) (hereinafter referred to as H$_{12}$MDI) were sequentially added and mixed thereto under stirring. Heat generation was observed as the reaction started. When the system became uniform, defoaming under reduced pressure was conducted while stirring at 80° C. for 3 minutes. This pre-polymerization solution was spread on a release-treated glass sheet (500×500 mm), and reacted for 15 hours in a nitrogen-purged furnace at 120° C. to obtain a transparent sheet having a thickness of 0.7mm with a mirror surface. The average hydroxyl value of the above three polyols was about 112. This cross-linked polyurethane type resin sheet had an elongation of 374%, a breaking strength of 771 kg/cm and a tensile strength of 30 kg/cm.

Preparation of a double layered laminate with glass

On one side of the above sheet, a transparent thermoplastic polyurethane adhesive was coated in a uniform thickness (20 μm), and then an embossed pattern was formed on the surface of this adhesive layer. Then, a sheet of glass of 3×300×300 mm was placed on the adhesive coating surface of this sheet, and the sheet was bonded to glass under a pressure of 13 atm at 120° C.

Surface-reforming

The urethane sheet-glass double layered laminate thus obtained was dipped into the following solution at a speed of 50 cm/min., and then immediately pulled out at a withdrawal speed of 10 cm/min.

| 1,6-Hexanediol diacrylate | 1200 parts |
| Benzophenone | 60 parts |
| Acetone | 1800 parts |
| Leveling agent | 15 parts |

The laminate was dried in a oven at 60° C. for one minute, and then the surface-reforming was conducted by means of a 120 cm/cm conveyer type high pressure mercury lamp irradiation apparatus by irradiating ultraviolet rays from a distance of 10 cm under a nitrogen stream at a conveyer speed of 5 m/min. The physical properties are shown in Table 1.

EXAMPLE 2

An embossed protective film (a polypropylene film) was laminated on the adhesive layer of the urethane sheet produced in Example 1. Then, this sheet was dipped into the following solution at a rate of 50 cm/min, and pulled out at a withdrawal speed of 10 cm/min.

| Neopentyl glycol diacrylate | 1200 parts |
| Benzophenone | 60 parts |
| Acetonitrile | 1800 parts |
| Defoaming agent | 15 parts |

The ultraviolet treatment was conducted in the same manner as in Example 1, and then the protective film was peeled off from the adhesive layer. Then, the sheet was laminated with a glass sheet in the same manner as in Example 1. The physical properties are shown in Table 1.

EXAMPLE 3

| Poly(1,6-hexanecarbonate)diol having a hydroxyl value of about 57 | 63.07 parts |
| Poly(caprolactone)diol having a | 99.12 parts |

| | |
|---|---|
| hydroxyl value of about 90.5 | |
| Poly(caprolactone)triol having a hydroxyl value of about 195.2 | 18.02 parts |
| Catalyst | 8.25 × 10⁻³ parts |
| 1,4-Butanediol | 14.42 parts |
| H$_{12}$ MDI | 80.37 parts |
| (Average hydroxyl value of the polyols: 89.25) | |

In the same manner as in Example 1, a transparent cross-linked polyurethane type resin sheet having a thickness of 1 mm was prepared.
 Elongation: 474%
 Breaking strength: 655 kg/cm$^2$
 Tensile strength: 33 kg/cm
Then, in the same manner as in Example 1, a surface-reformed laminated safety glass was prepared from the sheet. The physical properties are shown in Table 1.

EXAMPLE 4

A cross-linked polyurethane type resin sheet as obtained in Example 3 was subjected to surface-reforming in the same manner as in Example 2, and laminated with a glass sheet to obtain a laminated safety glass. The physical properties are shown in Table 1.

EXAMPLE 5

| | |
|---|---|
| Poly(1,6-hexanecarbonate)diol having a hydroxyl value of about 54.52 | 43.53 parts |
| Poly(caprolactone)diol having a hydroxyl value of about 70.79 | 68.41 parts |
| Poly(caprolactone)triol having a hydroxyl value of about 195.2 | 12.44 parts |
| Catalyst | 6.0 × 10⁻³ parts |
| 1,4-Butanediol | 12.44 parts |
| H$_{12}$ MDI | 63.18 parts |
| (Average hydroxyl value of the polyols: 88.5) | |

In the same manner as in Example 1, a transparent cross-linked polyurethane type resin sheet having a thickness of 0.7 mm was prepared.
 Elongation: 415%
 Breaking strength: 655 kg/cm$^2$
 Tensile strength: 38 kg/cm
In the same manner as in Example 1, a surface-reformed laminated safety glass was prepared from this sheet. The physical properties are shown in Table 1.

EXAMPLE 6

A cross-linked polyurethane type resin sheet as prepared in Example 5 was subjected to surface-reforming in the same manner as in Example 2, and then a laminated safety glass was prepared. The physical properties are shown in Table 1.

EXAMPLE 7

| | |
|---|---|
| Poly(1,6-hexanecarbonate)diol having a hydroxyl value of about 54.52 | 35.68 parts |
| Poly(caprolactone)diol having a hydroxyl value of about 90.79 | 124.87 parts |
| Poly(caprolactone)triol having a hydroxyl value of about 195.2 | 17.84 parts |
| Catalyst | 8.25 × 10⁻³ parts |
| 1,4-Butanediol | 14.27 parts |
| H$_{12}$ MDI | 82.34 parts |
| (Average hydroxyl value of the polyols: 94.0) | |

In the same manner as in Example 1, a transparent cross-linked polyurethane type resin sheet having a thickness of 1.1 mm was prepared.
 Elongation: 495%
 Breaking strength: 690 kg/cm$^2$
 Tensile strength: 35 kg/cm
In the same manner as in Example 1, a surface-reformed laminated safety glass was prepared from this sheet. The physical properties are shown in Table 1.

EXAMPLE 8

A surface-reformed laminated safety glass was prepared in the same manner as in Example 2 by using a cross-linked polyurethane type resin sheet as prepared in Example 7. The physical properties are shown in Table 1.

EXAMPLE 9

| | |
|---|---|
| Polycarbonate diol containing residues of 1,6-hexanediol and 1,4-cyclohexanedimethanol and having a hydroxyl value of about 128.6 | 22.40 parts |
| Poly(1,6-hexanecarbonate)diol having a hydroxyl value of about 55.87 | 22.40 parts |
| Poly(caprolactone)diol having a hydroxyl value of about 91.1 | 70.41 parts |
| Poly(caprolactone)triol having a hydroxyl value of about 195.2 | 12.80 parts |
| Catalyst | 6.0 × 10⁻³ parts |
| 1,4-Butanediol | 10.24 parts |
| H$_{12}$MDI | 61.74 parts |
| (Average hydroxyl value of the polyols: 101.9) | |

In the same manner as in Example 1, a transparent cross-linked polyurethane type resin sheet having a thickness of 0.7 mm was prepared.
 Elongation: 399%
 Breaking strength: 754 kg/cm$^2$
 Tensile strength: 53 kg/cm
In the same manner as in Example 2, a surface-reformed laminated safety glass was prepared from this sheet. The physical properties are shown in Table 1.

EXAMPLE 10

| | |
|---|---|
| Polycarbonate diol containing residues of 1,6-hexanediol and 1,4-cyclohexanedimethanol and having a hydroxyl value of about 128.6 | 21.85 parts |
| Poly(1,6-hexanecarbonate)diol having a hydroxyl value of about 55.87 | 21.85 parts |
| Poly(caprolactone)diol having a hydroxyl value of about 91.1 | 68.66 parts |
| Poly(caprolactone)triol having a hydroxyl value of about 195.2 | 12.48 parts |
| Catalyst | 6.0 × 10⁻³ parts |
| 1,4-Butanediol | 11.24 parts |
| H$_{12}$MDI | 63.93 parts |
| (Average hydroxyl value of the polyols: 101.9) | |

In the same manner as in Example 1, a transparent cross-linked polyurethane type resin sheet having a thickness of 0.7 mm was prepared.
 Elongation: 387%
 Breaking strength: 626 kg/cm$^2$
 Tensile strength: 45 kg/cm In the same manner as in Example 2, a surface-reformed laminated safety glass was prepared from this sheet. The physical properties are shown in Table 1.

TABLE 1

|  | Penetration resistance | Light transmission (%) | Taber abrasion (%) | Self-healing property (g) | Stain resistance | Sense of touch |
|---|---|---|---|---|---|---|
| Example 1 | Good | 91 | 2.0 | 147 | Stain removable | Good |
| Example 2 | Good | 90 | 2.3 | 148 | Stain removable | Good |
| Example 3 | Good | 90 | 2.1 | 130 | Stain removable | Good |
| Example 4 | Good | 91 | 2.2 | 133 | Stain removable | Good |
| Example 5 | Good | 92 | 2.0 | 115 | Stain removable | Good |
| Example 6 | Good | 90 | 2.1 | 120 | Stain removable | Good |
| Example 7 | Good | 91 | 2.4 | 157 | Stain removable | Good |
| Example 8 | Good | 91 | 2.5 | 159 | Stain removable | Good |
| Example 9 | Good | 91 | 1.0 | 150 | Stain removable | Good |
| Example 10 | Good | 90 | 1.3 | 120 | Stain removable | Good |
| Comparative Example 1 | Good | 91 | 1.3 | 150 | Stain substantially remains | Not smooth |
| Comparative Example 2 | Good | 90 | 1.4 | 130 | Stain substantially remains | Not smooth |

Comparative Examples 1 and 2 correspond to Examples 1 and 3 except that no surface-reforming was conducted.

We claim:

1. A sheet of a cross-linked polyurethane type resin having a self-healing property and having an elongation of at least about 250% and a breaking strength of at least about 300 kg/cm$^2$, wherein the cross-linked polyurethane type resin is a cross-linked polyurethane type resin obtained by reacting (a) a relatively high molecular weight polyol comprising at least one diol and at least one tri- or higher valent polyol and having an equivalent ratio of the tri- or higher valent polyol to the diol of from about 0.1 to about 0.6 and an average hydroxyl value of from about 70 to about 150, wherein at least a part of the relatively high molecular weight polyol is a polycarbonate type polyol, (b) a substantially bivalent chain extender in an amount of from about 0.4 to about 1.8 equivalent relative to one equivalent of the above polyol, and (c) a substantially bivalent polyisocyanate compound in an amount of from about 0.8 to about 1.2 equivalent relative to one equivalent of the total of the above polyol and chain extender.

2. The sheet according to claim 1, wherein the relatively high molecular weight polyol is a relatively high molecular weight polyol comprising at least one diol having a hydroxyl value of from about 60 to about 130 and at least one tri- or higher valent polyol having a hydroxyl value of from about 150 to about 250, which has an average hydroxyl value of from about 80 to about 140.

3. The sheet according to claim 2, wherein the relatively high molecular weight polyol comprises the polycarbonate type polyol and a polyester type polyol.

4. The sheet according to claim 3, wherein the diol comprises a polycarbonate type diol and a polyester type diol.

5. The sheet according to claim 4, wherein the diol contains at least about 15% by weight of the polycarbonate type diol.

6. The sheet according to claim 3, wherein the tri- or higher valent polyol is a tri- or higher valent polyester type polyol.

7. The sheet according to claim 1, which is obtained by a one-shot method.

* * * * *